Feb. 20, 1940. McCLELLAND BARCLAY 2,190,691
CAMOUFLAGING
Filed Feb. 16, 1939 2 Sheets-Sheet 1

INVENTOR.
McClelland Barclay
BY
F. Bascom Smith
ATTORNEY.

Feb. 20, 1940. McCLELLAND BARCLAY 2,190,691
CAMOUFLAGING
Filed Feb. 16, 1939 2 Sheets-Sheet 2

INVENTOR.
McClelland Barclay
BY
F. Bascom Smith
ATTORNEY.

Patented Feb. 20, 1940

2,190,691

UNITED STATES PATENT OFFICE 2,190,691

CAMOUFLAGING

McClelland Barclay, New York, N. Y.

Application February 16, 1939, Serial No. 256,661

5 Claims. (Cl. 41—17)

This invention relates to camouflaging and more particularly to a novel method of camouflaging whereby the actual size and shape of a moving body such as an aircraft is caused to become indistinguishable.

It is often highly desirable, particularly in warfare, to confuse an observer as to the size and shape of a moving body and thereby cause said observer to be deceived as to the speed and direction of travel of said body. For example, in aerial combat a definite advantage may be secured over an enemy plane if the pilot thereof can be confused for a few seconds as to the speed, course, size or type of an adversary. In addition, enemy ground defenses are rendered ineffectual against an aircraft when the latter is suitably camouflaged to cause an enemy observer to misjudge the distance from the craft to the ground batteries, or the direction of travel of said craft relative to said batteries. Accordingly, one of the objects of the present invention is to provide a novel method whereby a craft, such as an airplane, has painted or stenciled thereon a multiplicity of designs of such color and configuration as to secure a desired confusion in the eyes of an enemy observer.

The above and other objects and novel features of this invention will more fully appear from the following detailed description when the same is read in connection with the accompanying drawings. It is to be expressly understood, however, that the drawings are for the purpose of illustration only and are not intended as a definition of the limits of the invention, reference being primarily had for this latter purpose to the appended claims.

In the drawings wherein like reference characters refer to like parts throughout the several views, Fig. 1 is a plan view of the bottom of a plane camouflaged in accordance with the present invention;

Figure 1:
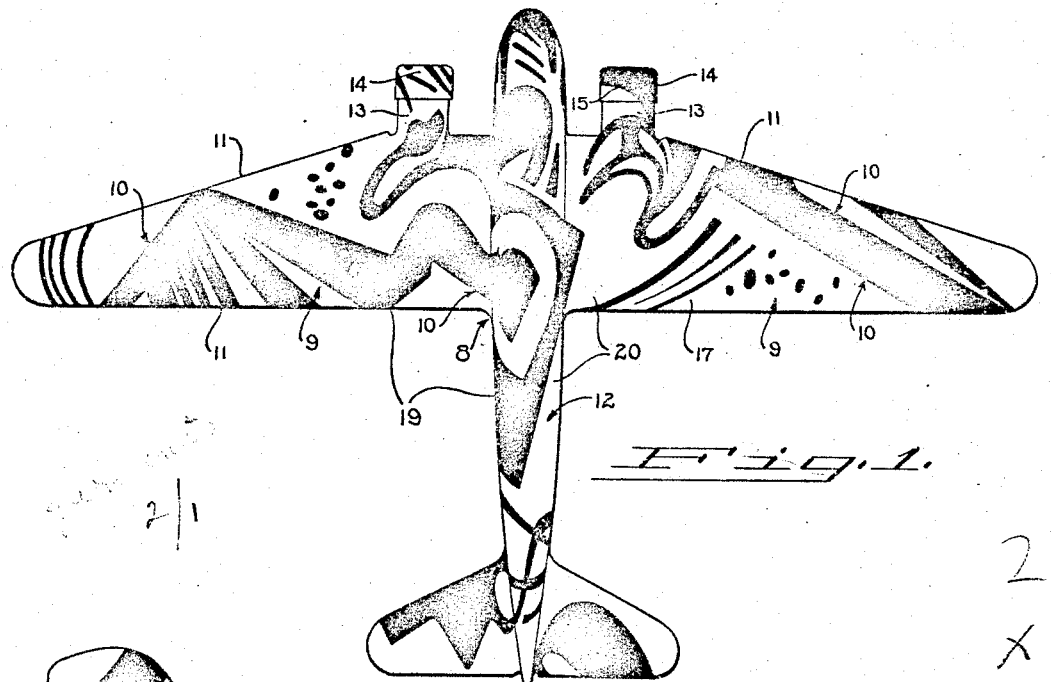
Figure 2:
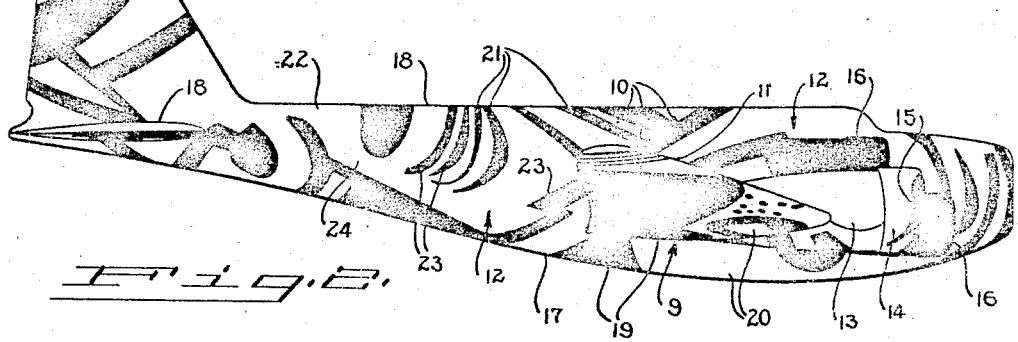
Fig. 2 is a view in elevation of the port side of the above plane.
Figure 3:
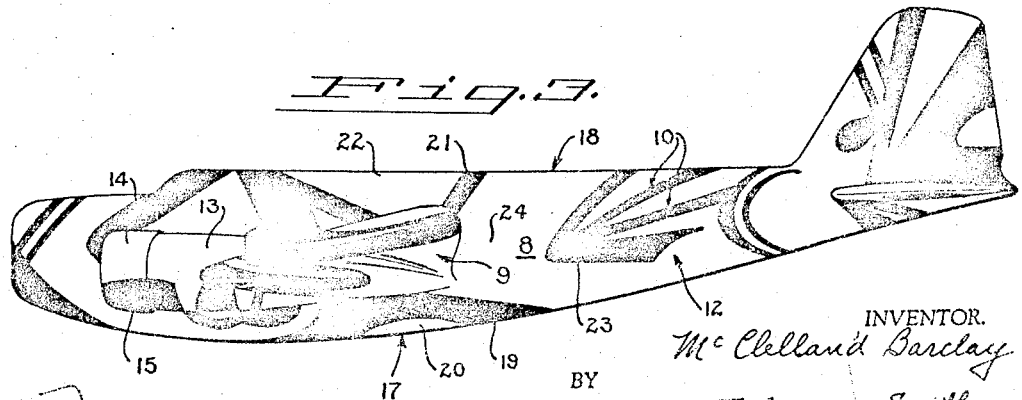
Fig. 3 is a similar view of the starboard side of said plane.

In Figs. 1 to 3 the invention is illustrated, by way of example, as applied to a bi-motored monoplane 8. A bold, dominating design is painted on the surface of wings 9 (Fig. 1) of said plane and takes up the greater area of said surface, said design being painted in colors which make lines 10 of the elements of the design very distinct and more definite and apparent to the observer than silhouette or surface lines 11 of said wings. The design elements which are generally trapezoidal tending toward triangular, have straight or curvilinear boundaries, and lines 10, constituting said boundaries are directed to an imaginary vanishing point different than the natural vanishing point of silhouette lines 11 of the wing surfaces. Thus, the eyes of an observer are drawn to the design covering the wing rather than to the actual form of the wing and said observer is confused by the perspective of said designs as to the size of the wing surface and as to the direction in which the wing extends.

Where there is an intersection of surfaces, such as at the junction of wing 9 with fuselage 12 or with motor housings 13, lines 10 of the design elements are continued from said wing surface over said fuselage or housing surface causing said surfaces to blend together and appear as one smooth surface. Lines 10 of the design are drawn to intersect the lines of intersection at an oblique angle and when viewed from the front of plane 8, appear smooth and unbroken although drawn on two surfaces angularly disposed to each other. The lines of intersection, which are important reference lines by which an observer makes his approximations of course and distance, are thus obliterated to a great extent, confusing the observer.

Bodies, such as cowlings 14 of motor housings 13, are broken up with design forms 15 which completely disguise the actual shapes thereof, bewildering the observer so that the latter believes he is simply viewing a painted patch instead of a definite structural form. This principle is also utilized to disguise the form of rectangular windows, a design of distinct outline being painted around said window, said design having boundary lines oblique to the lines of the window perimeter and being shaped to have a vanishing point in the opposite direction from the natural vanishing point of the windows as viewed by an observer positioned in front of the ship.

To augment the disguise of these structural shapes, particularly when the shapes are difficult to obliterate by being broken up with bold designs, design elements having identical forms to said shapes or portions of said shapes are painted in close proximity to the structure, said elements constituting the dominant design of that area. An example of this form of disguise is illustrated by design elements 16 in the vicinity of motor cowling 14 in Fig. 2. Thus, the desirable features of the camouflage method above outlined, are retained and, in addition, a confusion as to the location of the structural shape to be disguised is created since it becomes extremely difficult to distinguish the actual shape from painted forms 16 simulating said shape.

The general design shown in Fig. 1 as applied to lower surface 17, of airplane 8, may also be utilized on top surface 18 of wings 9 and fuselage 12. The elements constituting the upper surface design may be somewhat heavier for reasons to be hereinafter stated but the camouflaging principles controlling the design arrangement are the same as those governing the arrangement on the lower surface.

Normally, with the plane flying in level position relative to the earth's surface, the various plane surfaces are subjected to different intensities of light and accordingly a fairly well defined line of demarcation exists between surfaces such as the better illuminated upper surface 18 and the shadowy lower surface 17 of wings 9. To obliterate this and other similar lines of demarcation and thereby augment the effectiveness of the designs as a means for confusing an observer, the tones employed to create the desired designs are varied in hue for the different surfaces in accordance with the amount of light normally striking said surfaces.

In each instance, two tones are preferably used for the designs, and the bottom of the plane which receives the least light is covered with a light and brilliant combination comprised of colors such as a bright blue 19 and a white 20. The upper surface designs, which are preferably heavier, are painted in darker colors reflecting less light than the lower surface designs said colors being, for example, a deep blue 21 and a dark gray 22. The side surfaces which receive an intermediate amount of light are preferably colored with neutral shades of a blue 23 and a gray 24. Thus, the surfaces when subjected to the varying intensities of light tend to reflect a uniform amount of light and lines by which an observer might distinguish the actual plane silhouette are eliminated and the observer must resort to the confusing and misleading design arrangement as a basis for observations.

The color tones by which the contrasting effect of light and shadow is substantially reduced also serve to decrease the visibility of the moving craft. The brighter colored lower surface 17 of plane 8 is usually observed against the bright sky whereas the more somberly colored upper surface 18 is usually viewed against the darker earth's surface and accordingly the surfaces tend to blend with the backgrounds against which they are viewed and become less visible.

Figure 4:
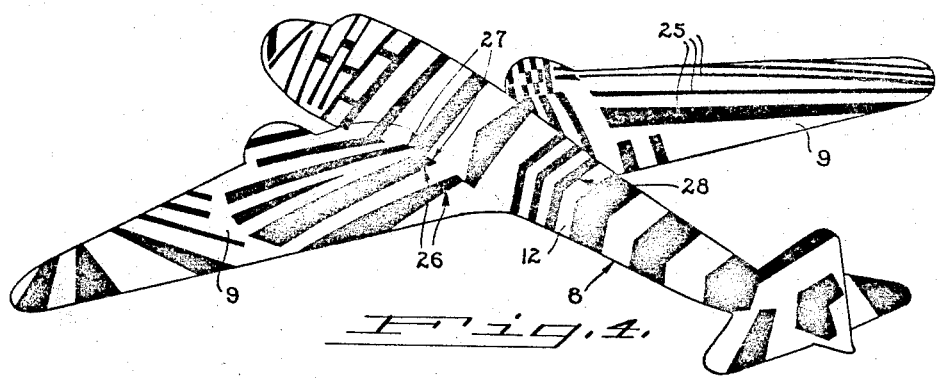
Fig. 4 is a view of a plane as seen by an observer positioned somewhat above and on the port quarter thereof showing a form of camouflage which may be applied to the top surfaces of a plane.
Figure 5:
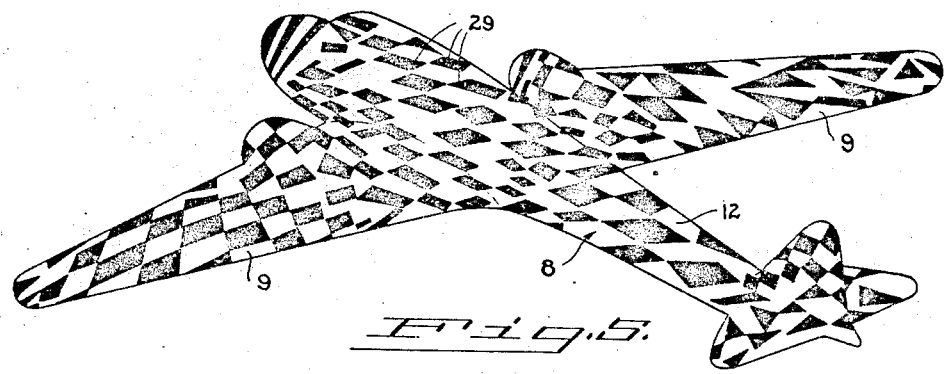
Fig. 5 is a similar view of a plane illustrating a variation in the camouflage design; and, Fig. 6 is a view of a plane as seen by an observer positioned somewhat below and on the port bow thereof showing another form of camouflage and the effect thereof upon an observer.
Figure 6:
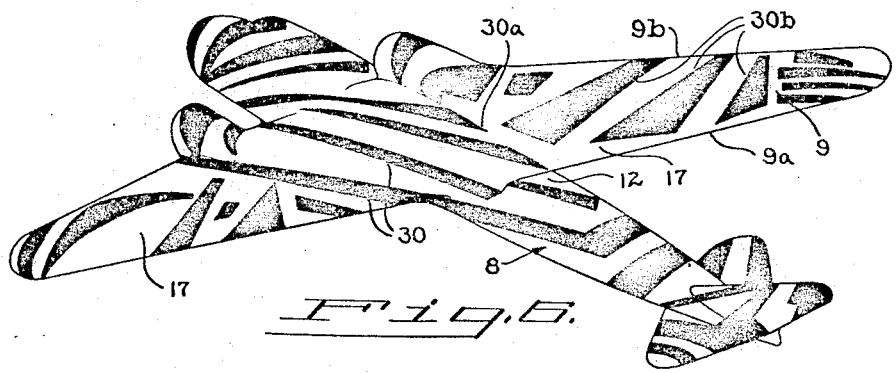

Some of the variations of the design elements and design locations within the scope of the invention are illustrated in Figs. 4 to 6. It will be noted that design elements 25 applied to the plane surfaces as shown in Fig. 4 are almost all of a trapezoidal shape and bonded by rectilinear lines. The termination of a group 26 of said design elements in the vicinity of the intersection of wing 9 with fuselage 12 produces an apparent intersection line 27 different from the actual intersection line of said surfaces and illustrates the application of the principle, hereinbefore disclosed, of creating, by the design elements, an imaginary line or shape whereby an observer is confused as to the position of said actual line or shape. In addition, by providing a sequence of similarly shaped design elements of varying thickness with the thickness decreasing in the direction of the observer, such as the group 28 of elements on the rear of fuselage 12, the stern end of the fuselage will appear closer to the observer than is actually so and will confuse the latter as to the angle between the wing and fuselage and as to the size and shape of the fuselage.

A camouflage which is particularly effective to disguise the size of a plane is illustrated in Fig. 5, as consisting of an intricate design which is formed by the repetition of comparatively small design elements 29. By reducing the scale of the design elements and thus increasing the number of intersecting lines covering the plane surfaces, an illusion of an increased surface size is created. An observer viewing the plane from some distance believes he is seeing a larger plane, and accordingly estimates the distance thereto incorrectly. Furthermore, none of the effectiveness of the camouflage, whereby the direction of flight is disguised, is lost by the use of smaller design elements since the latter are painted to appear like rectangular elements of the same shape and size which have been distorted by the effect of perspective, said perspective having vanishing points much closer to the observer than the natural vanishing points of the plane surfaces and lines. Thus, the boundaries of the design elements converge in an exaggerated manner along substantially straight lines to the front of plane 8 so that the latter appears to have the stern end thereof closer to the observer than is actually so, this illusion being augmented by having the heavier designs on the wing closer to the trailing edge.

The effect of a camouflage applied to plane 8 in accordance with the present invention upon an observer positioned below and in front of said plane, is clearly illustrated in Fig. 6. Design elements 30 painted upon the plane surfaces in accordance with the principles heretofore described create the illusion that plane 8 is flying below and away from the observer. Where said design elements extend over intersection lines, such as the intersection of fuselage 12 with wing surfaces 17, the same are positioned so as to appear smooth and unbroken. However, said elements are preferably caused to terminate abruptly and change direction on the smooth wing surface as at 30a, thereby creating the illusion of a silhouette line, as though an observer was viewing the fuselage top and not said wing surface. To cause trailing edge 9a of wing 9 to appear closer to the observer than leading edge 9b, design elements 30 are caused to converge in directions opposite to the natural perspective convergence of the silhouette lines, group 30b of said design elements being an example of this type of convergence.

There is thus provided a novel method of camouflaging moving bodies and surfaces whereby the actual shape and size of said bodies or surfaces is disguised and whereby a desired illusion in the eyes of an observer is effected. When applied to moving craft, such as airplanes, the camouflaging disguises the plane characteristics in a manner which prevents an antagonist in a plane or on the ground from making an accurate observation regarding the size, speed, type and direction of travel of the camouflaged plane, as well as the distance between himself and said plane. When ships, so camouflaged, fly in formation, it becomes difficult to determine the number of ships in the flight and the type of flying formation. Furthermore, the present invention provides a method for concealing or obliterating the position of armaments and thereby gives the occupants of a camouflaged plane a distinct advantage over an attacking adversary.

It is to be expressly understood that the invention is not limited to the several embodiments of the same which have been illustrated and described. Various changes, which will now be apparent to those skilled in the art, may be made without departing from the spirit and scope of the invention. For a definition of the latter, reference will be had primarily to the appended claims.

What is claimed is:

1. The method of camouflaging an aircraft to decrease the visibility thereof which consists in laying out a plurality of designs on the craft surfaces, said designs having boundaries extending at oblique angles to the craft silhouette and surface intersection lines and said design boundaries converging toward vanishing points differing from the natural vanishing points of the surface outline, coloring the designs on the top surface of the craft with deep blue and dark gray, coloring the designs on the sides of the plane with blue and gray to produce a medium hue, and coloring the designs on the bottom of the plane with bright blue and white, said last named pair of colors being adapted to blend with a sky background.

2. The method of camouflaging an airplane which consists in applying a plurality of distinct designs on the surfaces of said airplane, said designs being trapezoidal in shape and having boundaries which are disposed at an oblique angle relative to the outlines of the airplane surfaces, some of said designs extending from one to the other of intersecting surfaces of the airplane, said designs being created with colors determined by the relative intensity of the light striking said surfaces when the airplane is in normal flight, the surface receiving the most light being colored with colors which are adapted to reflect the least light.

3. The method of camouflaging an aircraft which comprises producing on the surfaces thereof a multiplicity of bold and distinct trapezoidal designs having the longest sides thereof disposed at an oblique angle to the surface intersection and silhouette lines of the aircraft, said designs converging as though in perspective in the direction of points which are located in the opposite direction from the natural vanishing points of the aircraft silhouette lines when the latter are viewed by an observer positioned in front and below the aircraft.

4. The method of camouflaging an airplane which consists in applying a plurality of prominent trapezoidal designs to the surfaces of said airplane, said designs having the boundaries thereof disposed at an oblique angle relative to the outlines of the airplane and to the intersection lines of intersecting surfaces of the airplane, some of said designs extending at an oblique angle across said intersection lines.

5. The method of camouflaging aircraft to confuse adversaries which consists in providing a plurality of distinct designs on the aircraft surfaces, a majority of said designs having their boundaries disposed at oblique angles to the outlines of said surfaces and some of said designs being located in the vicinity of characteristic structural elements of the aircraft, and being shaped to simulate the contours of said elements.

McCLELLAND BARCLAY.